United States Patent [19]

Monzyk et al.

[11] Patent Number: 4,883,365
[45] Date of Patent: Nov. 28, 1989

[54] DEVICE FOR MEASURING SUBSURFACE TEMPERATURES OF LIQUID BODIES, USEFUL FOR DETERMINING OPTIMUM FISHING LOCATIONS

[76] Inventors: Bruce F. Monzyk, 2254 Murray Forest, Maryland Heights, Mo. 63043; Lloyd A. Woodard, 7322 E. 107th St., Kansas City, Mo. 64134

[21] Appl. No.: 46,782

[22] Filed: May 7, 1987

[51] Int. Cl.⁴ .................. G01K 1/14; G01K 13/00
[52] U.S. Cl. ............................ 374/136; 43/4; 374/157; 374/208
[58] Field of Search ............ 374/136, 156, 157, 161, 374/141, 147, 104, 111; 73/292; 43/4

[56] References Cited

U.S. PATENT DOCUMENTS

| | | | |
|---|---|---|---|
| 1,623,666 | 4/1927 | Ferkel | 374/161 |
| 2,035,334 | 3/1936 | Monrad | 374/157 |
| 2,807,166 | 9/1957 | Farrell | 73/292 |
| 3,260,111 | 7/1966 | Godbey | 374/136 X |
| 3,623,369 | 11/1971 | Kjellberg | 374/157 |
| 3,695,110 | 10/1972 | Biolik | 374/157 |
| 3,782,195 | 1/1974 | Meek et al. | 374/161 |
| 3,864,976 | 2/1975 | Parker | 374/161 |
| 3,961,531 | 6/1976 | Peng | 374/156 |
| 4,000,653 | 1/1977 | Booth et al. | 374/141 X |
| 4,022,706 | 5/1977 | Davis | 374/162 X |
| 4,281,543 | 8/1981 | Raz | 374/147 |
| 4,722,595 | 2/1988 | Siol | 374/161 X |
| 4,738,549 | 4/1988 | Plimpton | 374/161 |

*Primary Examiner*—Daniel M. Yasich
*Attorney, Agent, or Firm*—Henry W. Cummings

[57] ABSTRACT

The device of the invention consists of a temperature sensitive device embedded in a matrix which provides a useful heat flow pattern. Apparently the device exploits the difference in the thermal conductivities of air versus other media, such as water or slurries, to function. Plastics are the preferred matrix material for most applications. The insulating and non-wettability properties of plastics may contribute to the observed useful properties as well. The chemical resistance of certain plastics can provide additional useful variations. The invention is especially useful as an aid to fishing. The device readily and simply identifies which waters have the best chance of containing fish. Other examples are municipal drinking water tanks, liquid cargo tanks, oil and water wells, etc.

26 Claims, 12 Drawing Sheets

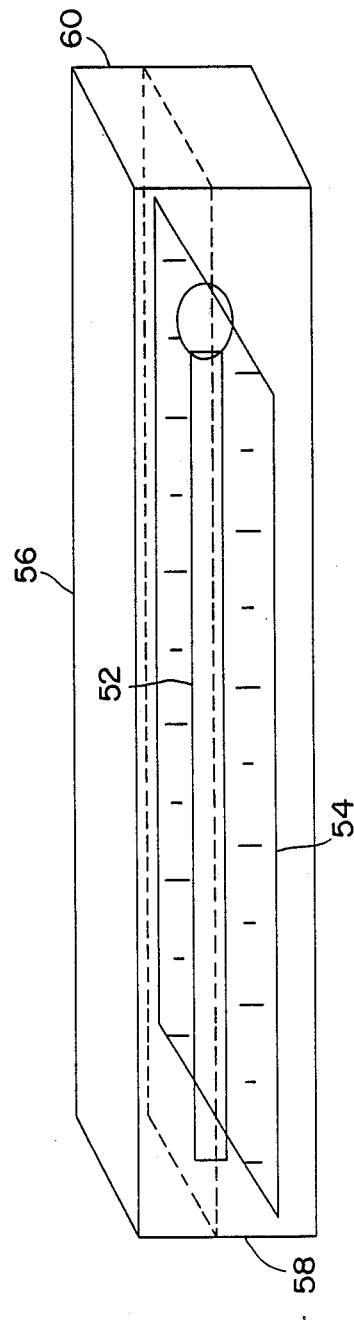

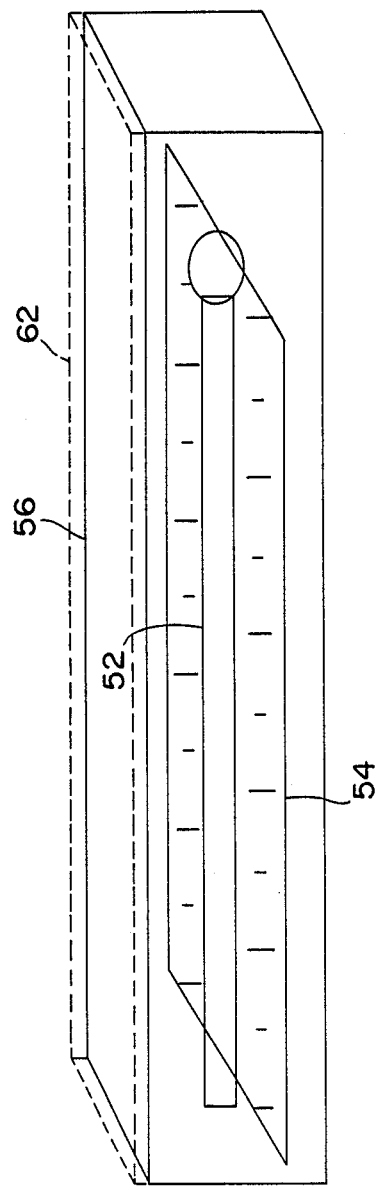

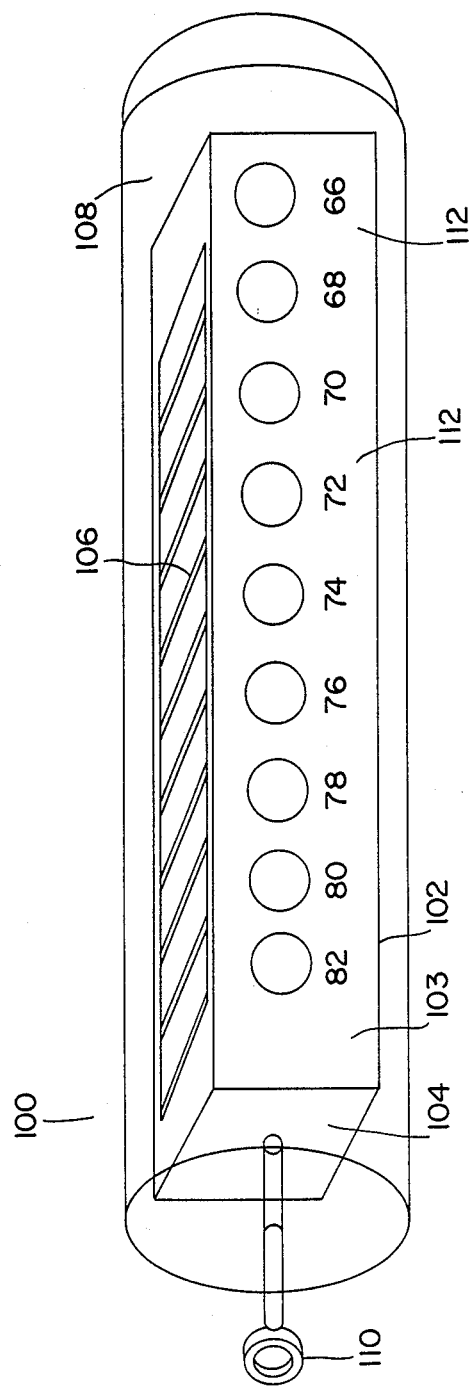

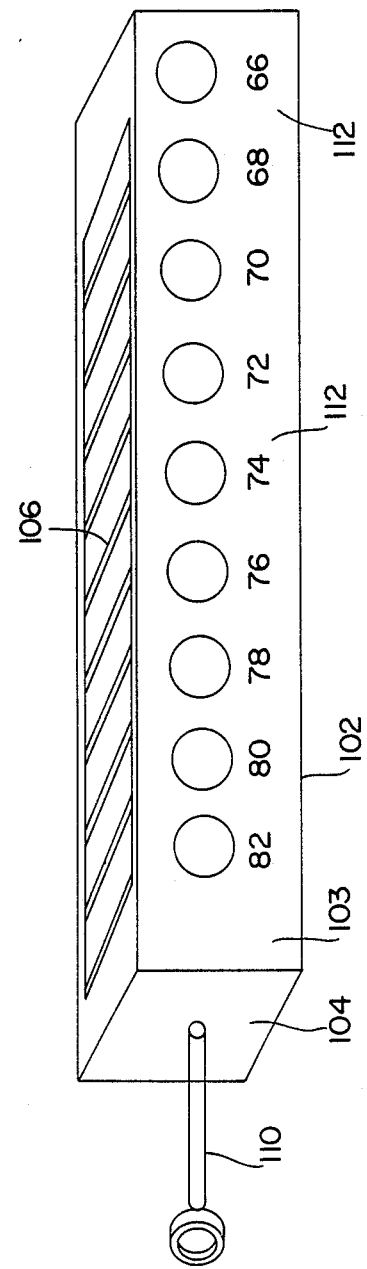

DEVICE FOR MEASURING SUBSURFACE TEMPERATURES OF LIQUID BODIES, USEFUL FOR DETERMINING OPTIMUM FISHING LOCATIONS

BACKGROUND OF THE INVENTION AND DISCUSSION OF THE PRIOR ART

(A) Problems in General Temperature Measurement of Liquids

A method for readily measuring the temperature of liquids and slurries at positions other than at the surface of the liquid has been elusive. An example will serve to illustrate this problem.

Consider the difficulties in measuring the water temperature at the bottom of a lake fifty feet deep. Since thermometers, such as those based on liquid in glass, liquid crystals or bimetallic strips rapidly respond to temperature changes, they cannot be used to make this measurement. When these devices are lowered to the bottom of the lake and then raised to the surface for reading they quickly lose the temperature reading of the water at the bottom of the lake. The temperature recorded by these devices may reflect that of the intervening water or even of the air above the lake. In any event the recorded value is unreliable and does not reflect the temperature at the bottom of the lake.

The usual method for making such a temperature measurement is to lower a thermocouple to the bottom of the lake and to read the temperature using a suitable meter and power supply. This method is cumbersome and does not lend itself to ready and repeated use.

Besides being expensive, the equipment has the usual drawbacks associated with electrical contacts, long lengths of wire and useful life of electronic equipment at high humidity conditions. In addition, many of these environments can be very demanding in terms of physical stress (e.g. fishing boats) and corrosiveness (e.g. brines), particularly in windy conditions.

Another problem area of temperature measurement is with slurries where the suspended solids block the view of the temperature scale on the thermometer. Vats of paint, sewage, lakes of black brine, and rivers loaded with silt are some examples of these types of situations.

In these instances it is desirable to remove the thermometer from the liquid for reading. Cleaning of the thermometer may even be necessary. Normal thermometers lose their readings in just a few seconds on removal from such slurries.

Another problem area of temperature measurement is the area of corrosive and/or fuming liquids. Thermocouples are readily attacked by many corrosive liquids and strong fumes, such as acids, ammonia and caustic. Intensely smelling or volatile poisonous chemicals often discourage or prevent a person from making a close approach for a temperature measurement.

(B) Problems in Determining Optimum Fishing Waters Based on Temperature

It has been well established that fish seek out waters of a specific temperature, herein called the optimum temperature. Different species of fish prefer different temperatures. The range of preferred temperatures is from about forty degrees Fahrenheit for fish such as certain trout to about eighty degrees for certain tropical fish. Below this range fish do not take bait because they simply are not moving and feeding since they are cold blooded. Above this range the water is too warm and can be low in oxygen. Fish will not remain in this warm water for any significant length of time. This situation parallels that of humans who prefer the well known "comfort zone" of 72-78 degrees Fahrenheit. The effects of temperature on the habits of fish are an important part of Limnology, which is "the study of the behavior of lakes and other inland waters and of the various physical, chemical, meteorological, and biological conditions existing in them".

Temperatures of natural bodies of water are known to vary widely with the seasons, springs, currents, winds, amount of sunshine, time of day and ice coverage. This helps to make fishing exceedingly difficult since the fish move frequently in response to the ever changing water temperatures. Very often fisherman will spend hours trying to catch fish in waters which would not be expected to contain fish based on the water temperatures.

Fishing for crappie in the early spring is a classic example of this since the fish are feeding but are hard to find because there is still so much cold water present from the previous winter. Early spring warm air may mislead the fisherman since the water may still be too cold for crappie. Summer fishing conditions often create a similar situation in that most of the water is too warm for fish. This forces the fish into hard to find small pockets of cool water. Surface temperature readings, although easy to measure, are usually useless since they only indicate whether or not fish can be expected at the surface of the body of water. Fish are not normally close to the surface.

Normal thermometers simply respond too quickly to temperature to allow their use at other depths. The temperature readings of normal liquid in glass, liquid crystal and coiled spring type thermometers change quickly and significantly before they can be brought to the surface for reading. What is needed is a simple and reliable method to record water temperature at any depth. The present invention resolves this key need.

Although the temperature preferences of fish have been known for a long time it has not been possible for most fishermen to take advantage of this understanding since a good method has not been available to make the necessary measurements.

Devices representing the prior art in the area of water temperature measurement for the purpose of identifying optimum fishing waters are available through fishing equipment distributors such as E. HILLE CO. (page 29 of catalog No. 49) NETCRAFT CO.(page 15 of catalog #84-B) and CABELA'S (pages 80 and 81 of SPRING 1984 catalog). None of these devices is similar to the present invention. The addresses of these companies respectively are: CABELA'S, 812 Thirteenth Ave, Sidney, NB 69160; E. HILLE CO., P.0. Box 996, Williamsport, PA 17703; and THE NETCRAFT CO., 2800 Tremainsville Rd., Toledo, OH 43613. A discussion of this prior art follows.

Item #1D-10R9A on page 15 of the NETCRAFT CO. catalog and item #203-100-000 on page 80 of CABELA'S catalog are similar. These two devices consist of a liquid alcohol in glass type thermometer and a pressure sensitive metal valve. These devices function in a totally different manner than the device in the current invention. These devices measure temperature using a typical glass thermometer encased in a plastic tube. The valve allows water to enter the tube in an amount proportional to the depth and then the thermometer inside the tube reads the temperature of the water which entered the tube. This method of temperature measurement is sensitive to use methods. Therefore significant care in handling the device is required to avoid erroneous readings.

The device does not work in the important region from the surface down to about four feet since insufficient water enters the device to allow a temperature measurement. This is because of the low water pressure which exists at these shallow depths.

In addition the need for the metal pressure valve provides a fast cooling (or warming) effect once the device is removed from the depth of water in which a temperature measurement has been made and when it is handled or brought into the cool or warmer air.

Also, these devices become clogged with silt and mud when they strike the bottom during and before a measurement causing an erroneous reading when too much water enters.

A key problem in the use of this type of device is that it cannot be lowered past the depth to be measured since it would then allow too much water to enter. This results in erroneous depth and temperature readings.

Another problem with devices of this type is that fishermen rarely have the capability to measure depth accurately. Normally the depth "measurement" is so many reel cranks from the bottom or from the surface. Hence an absolute depth measurement is of little value to the fisherman.

These devices also require resetting before reuse which makes their use for repetitive measurements less attractive and slow.

A second type of device in the prior art (CABELA'S, page 80,#668-102-000) consists of a battery powered meter and thermocouple detector and a thirty foot cord. This device suffers from being too complicated for routine use, too awkward to use, susceptible to fouling and corrosion by the humid environment of fishing waters, and limited in both the depth and the information available to the user. It is also expensive. In addition, it is difficult for the fisherman to reproduce the depth read by the device with bait since it is totally separate from the fisherman's rod and reel.

A third type of device in the prior art (CABELA'S page 81,#317-100-000) is merely a temperature gauge with a detector which fits onto the bottom of a boat on which the meter is mounted. Obviously this device only can measure the surface water temperature which is of little value in determining where the waters are which are optimum for the type of fish being sought.

For example, on a lake in hot summer the fish will be at the thermocline which could be anywhere from five to about thirty feet below the surface depending on the length of the hot spell and other factors. The device will only give the surface temperature of say 80 to 90 degrees Fahrenheit which is of little value. This device is also very expensive.

The fourth type of prior art is the device offered by E. HILLE CO. (page 29 of catalog No. 49, part No. 2015). This device is just a normal thermometer in a rugged case. It is only useful for measuring the surface temperature of a body of water.

(C) REFERENCES 1. (a) Fundamentals of Temperature , Pressure and Flow Measurements" by Robert P. Benedict, John Wiley and Sons Inc. (New York, 1969).

(b) "Temperature Measurement" in the *Encyclopedia of Chemical Technology*, 19,774 (Kirk-Othmer, 1978).

2. (a) "The Fisherman's Encyclopedia" by Ira N. Gabrielson,Ed. Stackpole and Heck (New York, 1950), pp 231-244.

(b) Jerry Gibbs in *Outdoor Life* Nov. 1982 35.

(c) "Bass Like it Hot", *Outdoor Life* July 1983 88.

(d) "Survey of Marine Fishes of North Carolina" by Harden F. Taylor ,The University of North Carolina press, 1951, pp 21–36.

(e) "A History of Fishes" by J. R. Norman, Hill and Wang (New York, 1963), pp 266-275.

3. (a) "Liquid Crystals : The Fourth State of Matter" by Franklin D Saeva, Ed., Marcel Dekker Inc. (New York, 1983).

(b) "Liquid Crystals" in the *Encyclopedia of Chemical Technology*, 14 (Kirk-Othmer, 1978), 395ff.

(c) "Liquid Crystals : A colorful State of Matter" by G. H. Brown and P. P. Crooker, *Chem and Engin. News*, Jan. 1983 24.

(d) *Physics Today* 1982 35 25–73 (six review articles).

4. (a) Modern Plastics Encyclopedia 1984–1985, McGraw Hill Inc. (New York).

(b) *Plastics Technology Annual Processing Handbook* 1970–1971 16(10), Bill Publ., 1970.

(c) "Do It Yourself With Plastics" by Erich H. Heimann, Publ. E. P. Dutton and Co. Inc. (New York, 1975).

SUMMARY OF THE INVENTION

(A) GENERAL DESCRIPTION

The invention disclosed herein is a device which is useful for the measurement of temperature. The device is most useful for the measurement of temperature in certain situations where the usual temperature measurement methods either fail or would be very difficult to implement. The device is especially useful for the measurement of temperature of liquids whose depth, color or composition make temperature measurements of them difficult or impossible by normal means.

Examples of such difficult situations are water bodies such as lakes, river, oceans and streams at depths other than those at the surface or within reach. Other examples are municipal drinking water tanks, tanker trucks bearing liquid cargo, underground gasoline or kerosene tanks, sewage treatment plants, oil and water wells, vats and tanks of corrosive or fuming liquids and slurries, fermentation broths, etc.

The invention is especially useful as an aid to fishing. The device readily and simply identifies which waters have the best chance of containing fish. This connection is based on the scientific fact that fish seek out water of optimum temperature. This optimum temperature varies with the type of fish. As will be described this variation is readily provided for by the invention.

The device of this invention is composed of a temperature sensing part and a matrix part. As discussed below, the device may also contain other components which serve to make the device more convenient to use.

The device of the invention consists of a temperature sensitive device imbedded in a matrix which provides a useful heat flow pattern. Apparently the device exploits the difference in the thermal conductivities of air versus other media, such as water or slurries, to function.

Plastics are the preferred matrix material for most applications. The insulating and hydrophobic properties of plastics appear to be important also. The chemical and solvent resistance of certain plastics can provide additional useful variations.

Additional advantages of the device are that it is very simple to use and does not corrode or need batteries. It does not use wires or require resetting or contain moving parts or have depth limitations. In addition it does not require installation or accessories and is very durable. One or more of these features make this invention a marked improvement over the prior art.

(B) TEMPERATURE SENSOR

The temperature sensing part can be any of the well known stand alone devices for measuring temperature such as liquid in glass, liquid crystal ribbon, liquid-expansion or bimetallic strip. Even a thermocouple can be used.

All of these devices are normally used in conjunction with numbered scales off which the temperature is read using the temperature sensing component as a pointer. Thermocouples are usually used with analog or digital meters. Thermometers using these temperature sensors are well known in the art. Temperature sensors based on liquid in glass, bimetallic strip and liquid expansion have been known for a very long time.

The use of liquid crystals for the measurement of temperature is a fairly recent occurrence even though liquid crystals have also been known for many years. The category of liquid crystals which are most useful for temperature sensors is well known in the art as thermotropic liquid crystals. Thorough discussions are available in the literature. Reference 3a which discusses their use in temperature measurement and reference 3b discusses the various categories and other classifications of liquid crystals and references 3c and 3d which are concise reviews.

(C) THE MATRIX

The second component of the device of this invention, the matrix, works in conjunction with the temperature sensing component to produce the unique temperature measuring properties of this invention.

The matrix is preferably a clear, hydrophobic and thermally insulating material of sufficient thickness to impart the desired temperature response properties.

It is also preferable that this matrix has a specific gravity greater, than the bulk density or specific gravity of the medium whose temperature is to be determined.

The matrix can be made of glass or plastic or any combinations thereof.

The matrix is preferably a plastic since these are easier to mold and are more rugged than glass. Resins and the plastics prepared from them are described in the art.

Plastics which possess the above desired properties are the clear forms of polycarbonate (PC), polymethylmethacrylate (PMMA or acrylic), polystyrene (PS), flexible polyvinyl chloride (fPVC), cellulose acetate (CA), cellulose triacetate (CTA), ethyl cellulose (EC), allyl polyesters (AP), cellulose acetate propionate butyrate (CAPB), nitrile (N), amorphous nylon such as semicrystalline Nylon 6 or random polymer of Nylon 12 with cycloaliphatic and aromatic comonomers, random Nylon copolymers such as PA7030 (Upjon Co.). Transparent fluoroplastics such as polychlorotrifluoroethylene (PCTFE) and polyvinyl fluoride (PVF),(the fluoroplastics are marginally transparent even in fairly thin layers and are therefore not preferred).

Clear forms of polybutylene (PB), aromatic polyester (polyarylate), clear forms of alkyd polyester, polyethyene terephthalate polyester (PET), unsaturated polyester (UP), polyetherimide (PEI), transparent types of polyetheretherketone (PEEK), transparent types of high and low density polyethylene (HDPE<LDPE), transparent types of linear low density polyethlene (LLDPE), ionomer polyethlene (IPE), transparent forms of ethylene-acrylic acid (EAA) and ethlyene-methacrylic acid (EMAA), ethylene-ethylacrylate (EEA), ethylene-methacrylate (EMA), ethylene-vinylacetate (EVA), polymethyl pentene (PMP), polypropylene (PP) and crystal polystyrene (CPS). The translucent form of impact polystyrene (IPS) is not preferred since it is translucent.

Butadiene-styrene (BS) (polymers can be blended with compatible low transparency or opaque resins such as general purpose PS and SAN in widely varying ratios to obtain high clarity plastics.). Transparent forms of polyurethane (PU), vinylidene chloride polymers and copolymers (VDC), silicone, styrene-acrylonitrile (SAN), styrene-maleic anhydride (SMA) including terpolymers with butadiene, polysulfone, polyarylsulfone and polyether sulfone. Epoxy resin (ER), urea formaldehyde (UF) and melamine formaldehyde (MF) are also suitable.

Thermoset resins are preferred over thermoplastic resins when the higher processing temperatures required for thermoplastics cannot be tolerated by the temperature sensing component. Clear plastics are preferred over translucent ones.

It is sometimes possible to modify some opaque plastics by copolymerization with another monomer or additive to make them transparent. For example, transparent grades of ABS are made by using methyl methacrylate (MMA) as the fourth monomer. Modifications of this type are considered to be obvious extensions of the prior art of plastics processing.

Since plastics have a wide range of tolerances to solvents, and corrosive liquids, sunlight, etc, these factors would necessarily have to be taken into account in preparing a device for a specific application. These procedures would represent an optimization on the invention.

In a similar manner, a plastic needs to be chosen with a melting point above any temperature the device might experience in a particular application. Of course the temperature range of the temperature sensing component must be chosen according to the specific application also.

Some polymers could be made to function if a suitable transparent window is provided so that the scale of the internal temperature sensing component can be read. For example, such a window could be made of glass or a clear plastic.

Clear versions of flexible polyethylene (fPE) and high density polyethylene (HDPE) are usable also. However, since the specific gravity (0.92) of these two plastics is less than that of water (1.00) they would float on this liquid. A device made using these plastics would need to be weighted with lead or by some other means if it is desired to use the device in a water temperature measurement beneath the surface of the liquid.

Since many organic liquids have specific gravities in the 0.7 to 0.8 range, these plastics would be suitable for these liquids without any need for additional weight.

(D) THEORY OF OPERATION

The device consists of a temperature sensing element for temperature measurement in a matrix of the proper amount of hydrophobic insulation as discussed above. The unusual temperature response pattern of this device apparently relies on the differences in the thermal conductivities of liquids and air to function.

It has been found that when a temperature sensitive element is imbedded in a plastic matrix of sufficient thickness, an unexpected temperature response pattern develops. When the device is immersed into water, for example, the temperature can be seen to equilibrate within just a few minutes. However, on removing the device from the water it does not change its reading for a long time.

But if the device is inserted back into some water at a different temperature than the first it assumes this new temperature within seconds or just a few minutes.

This property is useful for the age old problem of measuring the temperature of water bodies at various depths. The device enables actual water temperatures to be taken at any depth without the use of cumbersome thermocouple wires or rapidly changing liquid filled glass thermometers or bimetallic strips.

Thus the present invention provides a reliable method for reading the temperatures of the liquids in a wide variety of situations.

It is simple to use and can be used repeatedly. It readily provides a method for measuring temperature in deep waters, slurries, corrosive or opaque liquids. To make such measurements the device is merely lowered, using any suitable line or rod, into the medium whose temperature is desired, such as the lake and opaque slurries referred to above. The device is allowed to hang at the position where a temperature measurement is wanted until thermal equilibration is attained. This may take from about thirty seconds to several minutes depending on the exact design of the device (see below). More time may be needed for very large devices and very large temperature differences.

The device is then rapidly withdrawn from the medium and the temperature at the depth where the thermal equilibration took place is read directly from the device. The device will hold this temperature for at least several minutes, again depending upon design. This is plenty of time for the user to record the temperature reading by visual observation.

Furthermore, the device is immediately ready for reuse without any further preparation. It is a significant feature of the invention that it readily thermally equilibrates in the medium being measured while at the same time it holds this temperature long enough in the air for a reading to be made.

Since temperature is a fundamental property of nature there is always a need for improvements in its measurement. This invention is a new method of temperature measurement. It enables the measurement of temperature in situations where the known methods either cannot be used or are very difficult to implement. Thus this invention also addresses a key need since temperature is a fundamental property of nature.

(E) APPLICATION OF THE INVENTION TO FISHING

The device is very useful for determining optimum fishing depths and locations.

It can be used at any depth merely by letting it down into the water attached to a line. In fact it is preferred that the device be lowered using a normal fishing rod and reel. The exact depth in which the measurement was taken is easily reproduced with bait since the number of reel cranks up from the bottom or down from the surface are easily counted and then reproduced.

The device can be used for both trolling and still fishing. It is useful in both fresh and salt water. It provides reliable information even in the presence of undercurrents, springs, and thermoclines. In fact it is useful for identifying these underwater features which strongly affect the habits of fish.

It does not require batteries or other sources of power. It is very durable and small in size which allows storage along with other fishing equipment, such as lures, hooks, corks etc., in a fishing tackle box making it always readily available. The device is not harmed nor its effectiveness diminished if it drops into the mud, sand etc.

After one use it is immediately ready to be used again and again. This is very desirable since a number of measurements may be necessary to identify the optimum area in which to fish. The device disclosed within uniquely provides all of the above features.

The problem in measuring temperature in order to identify the optimum waters for fishing is best described by using an example.

Suppose it is desired to catch rainbow trout in a lake 200 feet deep. From the literature it is known that the optimum temperature for rainbow trout is 61 degrees Fahrenheit. If one were to attach a normal thermometer to a line and lower it into the water looking for the depth where the water temperature is closest to 61 degrees Fahrenheit a problem would occur. It would be impossible to bring the thermometer back up to the surface and read it before the reading changes. The thermometer might have read 61 degrees Fahrenheit at that particular depth but it would warm or cool by the intervening water and air between the depth of measurement and the fisherman.

Alternatively, one could employ a thermocouple and battery powered gauge (see DISCUSSION OF PRIOR ART above). However these are cumbersome, limited by the length of wire, subject to corrosion of the gauge etc. In addition these devices are very expensive.

The present invention works in the following way.

A tape containing a temperature sensing component, such as a liquid crystal ribbon, is used to measure temperature. This tape is encased in enough clear resin (plastic) to control heat flow but not too much in order to avoid undesirably long thermal equilibration times.

This device is lowered into the body of water to be fished. Preferably this is done by attaching the device to the line of a normal fishing rod and reel and then lowering or casting it into the water as would be done normally with bait or a lure. After sufficient time has been allowed for the device to thermally equilibrate, from about thirty seconds to about five minutes depending upon the exact design, the device is quickly retrieved and the temperature is read. The fact that a reel is used makes retrieval almost trivial since there is no loose line to deal with.

This measurement is easy to make and can be done reliably since the resin provides sufficient insulation and hydrophobicity so that the device holds the temperature for at least several minutes in the air while it is being read by the fisherman. At least one thirty-second of an inch and preferably at least one sixteenth of an inch of insulating plastic should be provided between the temperature strip and the liquid of which the temperature is being measured, so that the intervening water between the depth of the water measurement and the surface doesn't change the reading in the time it takes to retrieve the device (normally less than one minute). The hydrophobic nature of the device prevents wetting by water. This prevents sudden cool off of the device by flash evaporation when the device is raised into the air from the water (wind chill).

THE DRAWINGS

FIG. 1: Is a schematic illustration of one method of forming the device according to the present invention.

FIG. 2: Is a view of an alternative method of aforming the device of the present invention.

FIG. 3A: Is an illustration of Step 1 of preparation according to method B.

FIG. 3B: Is a schematic illustration of Step 2 of preparation according to method B.

FIG. 3C: Is a schematic illustration of Step 3 of preparation according to method B.

FIG. 3D: Is a schematic illustration of a device prepared according to method B.

FIG. 4A: Is an illustration of a mold for preparing devices according to method C.

FIG. 4B: Is a view with the temperature sensor to be used in method C.

FIG. 5: Is a finished device prepared according to method C.

FIG. 6A: Is a mold which may be used in method D.

FIG. 6B: Is a temperature sensor in which may be used in method D.

FIG. 6C: Is a finished device prepared using method D.

DESCRIPTION OF PREFERRED EMBODIMENTS

(F) PREPARATION OF TEMPERATURE MEASUREMENT DEVICES OF THE INVENTION

Figure 1:
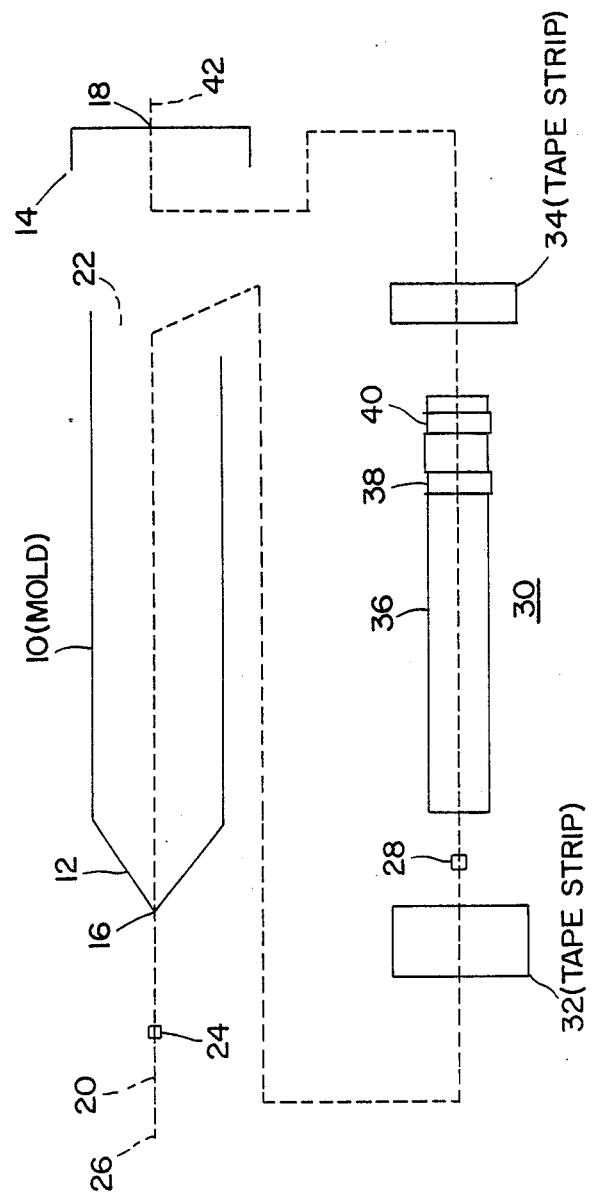

This section provides some of the general procedures and considerations which bear on the actual preparation of suitable devices of the invention. This information in no way implies, or should be construed to imply, limitations on the design of the device. The procedures given are by no means the only way such devices can be prepared. Other methods will be obvious to one skilled in the art of plastics processing and molding.

Unsaturated polyester resins were used to prepare the devices in the PREPARATION METHODS section given below. Suitable resin can be obtained through retail outlets as "CLEAR LIQUID PLASTIC CASTING RESIN" available from Chemco Resin Crafts Co. of Dublin, CA 94568 (stock no. 00183). Another such resin is "ENVIRO TEX CASTING RESIN" from Environmental Technology Inc. of Fields Landing, CA 95537 (stock no. 5032). A third example of a suitable resin is GLASS-KOTE Clear Casting Resin from Plastic Sales and Manufacturing Co. Inc. of 3030 Cherry St., Kansas City, MO 64109.

A suitable catalyst for these polyester resins is methyl ethyl ketone peroxide. MODERN PLASTICS ENCYCLOPEDIA reference 4a, pages 160-162 discusses the available peroxides and their use. Methyl ethyl ketone was used in the preparations discussed below since it is excellent for room temperature applications. This material is also known as a hardener and is also available from Chemco Resin Crafts Co.

As discussed previously, many plastics are suitable and can be chosen to optimize performance for particular applications. Each resin has unique use and handling procedures. These are thoroughly described in the prior art.

Background references 4a-c adequately discuss resins and their handling and processing techniques for converting them to plastics. These references are also very useful in identifying suppliers for these resins and other materials involved in plastics production.

These same references contain copious amounts of physical and chemical property data on resins and the plastics derived from them. This data is very useful for the identification of resins which can be used to match the physical and chemical properties of the plastics to the specific application of the device. Examples of such properties include optical clarity, weather resistance, ease of molding, compatibility with information inserts and thermometer strips (e.g. melting point, cure temperature, mutual insolubility), chemical resistance to the liquid in which temperature measurements will be made.

Examples of properties which need to be considered in matching a device to a particular application are transparency, durability, a density greater than the liquid in which a temperature measurement is to be made, and a non-wetting and inert surface to prevent wind chill type cooling effects when the device is raised from the liquid. Therefore a hydrophobic surface is needed if the liquid is aqueous and a hydrophylic surface would be desired for measurements in nonpolar liquids such as gasoline, fuel oil, oil or petroleum.

Another property needed of the plastic is low thermal conductivity. All of the plastics mentioned above have adequately low thermal conductivity. Plastics filled with conductive fillers. for example with nickel powder, would not be desirable if the level of filler was great enough to impart electrical conductivity to the plastic. Good corrosion resistance to the medium the device is to be used in, and the ease of processability in preparing the device are also desirable properties of the plastic.

EXAMPLES

Below are listed procedures which were used to prepare devices according to this invention.

The unsaturated polyester resins described above were used in the preparations. Unsaturated polyester thermoset resin is composed of polymers of phthalic anhydride, maleic anhydride and glycols in styrene copolymer and solvent. Styrene usually composes about 45 to 50% of the total by weight. The version referred to as "gel coat" is the most preferred. The peroxide catalyst initiates the free radical polymerization chemical reaction which causes the styrene to polymerize and crosslink the unsaturated polyester causing the entire mass to harden to a clear and colorless thermoset plastic.

Preparation Method A is for the use of liquid crystal ribbon or coil spring temperature sensors. Preparation Method B is for the use of liquid in glass temperature sensors with a low maximum temperature.

Preparation Method B is most suitable in situations where there is some concern that the component within the matrix may not withstand the temperatures encountered in a rapid cure of the thermoset or in thermoplastic processing.

Preparation Method C and D are more suited for mass production.

1. PREPARATION METHOD A

The setup arrangement used for Method A is shown in FIG. 1. A sixty milliliter tapered polypropylene round tube (10), with a inside diameter of 1.014 inch at the bottom and 1.065 inch inside diameter at the top with a conical bottom (12) and a cap (14) was used as a mold. This mold produces devices of about the above tapered thickness and 4.20 inches total length with the conical portion equaling 0.563 inches of this length.

One pinhole (16) was drilled in the bottom of the tube and one pinhole (18) in the center of the cap. About two feet of monofilament line (20) was threaded through the hole (16) in the bottom of the tube.

Almost all of the line (20) is pulled through the hole (16) from the top of the tube. A knot (24) placed near the end of the line (20) below the bottom (16) of the tube prevents the end (26) of the line from going through the orifice (16) of the tube. Another knot (28) is tied on the line close to and outside of the orifice (22) of the tube. The line (20) is then taped down onto a surface (30) with tape strips (32) and (34).

A liquid crystal thermometer (36) containing desired information such as a list of optimum temperatures for game fish (38) and (40), is placed upside down under the line. The information strip (38) and (40) and thermometer (36) are glued to the line (20) at a distance up from the second knot (28) such that they will be recessed into the resin when the second knot (28) is pulled to the hole (16) in the bottom of the mold (10). Scotch tape can be used instead of glue or the glue may be as an adhesive on the temperature and/or information tape(s). The tapes (32) and (34) are removed enabling the thermometer (36) and information tapes (38) and (40) to become mobile.

The thermometer (36) and the tape(s) (38) and (40) are pulled into the mold (10) using the line extending from the bottom hole (16). A third knot (42) (FIG. 2) is tied in the line (20) on the outside of the bottom of the mold and next to the mold to support the mold subsequently and to stopper the pinhole (16) to prevent resin leakage.

A sufficient amount of the CHEMCO unsaturated polyester resin, described above, was added to a mixing container. Sufficient catalyst, for example benzoyl peroxide or methyl ethyl ketone peroxide, is added to the resin and the mixture was blended thoroughly and poured into the mold. Too much catalyst and too warm a temperature has to be avoided to prevent cracking of the device during curing. For the above mold, two ounces of resin and sixteen drops (at about 0.05 ml per drop) of methyl ethyl ketone peroxide and a room temperature of about 65 degrees Fahrenheit was found to give a good product.

Figure 2:
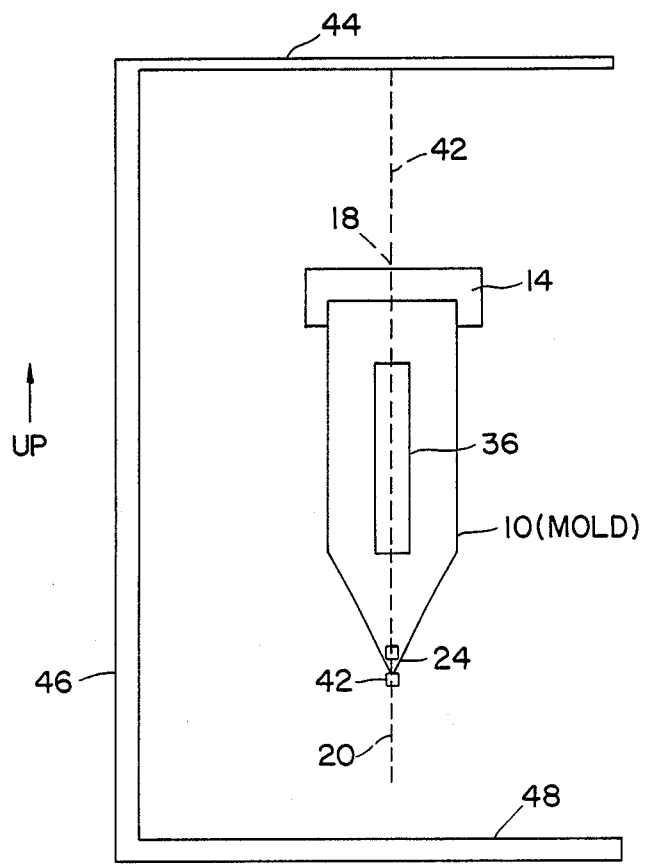

Immediately after the catalyzed resin has been poured into the mold (10) the line (20) from the top of the mold is fed through the pinhole (18) in the cap (14) and then the cap is placed onto the mold (FIG. 2). The line portion (42) protruding through the cap is then tied to a suitable horizontal support being a vertical arm (46) and a base (48). The mold (10) is allowed to hang suspended in the air until it has cured (hardened). The mold is held in place by the knot (42). Hanging the mold (10 and 14) in this manner holds the thermometer straight in the mold.

Alternatively, a vacuum may be applied to the airspace above the resin to hasten the removal of trapped air which is present in the resin as bubbles introduced in the mixing step. These bubbles rise and leave unassisted if the cure rate isn't too fast.

Depending on the resin used, the amount of catalyst used and the curing temperature, a post cure heating may be desirable to avoid a sticky surface on the product. One half to two hours at 175 to 225 F. is sufficient to post cure the device produced by the above procedure. Addition of activator, normally cobalt naphthenate, may be used instead, as is well known in the art.

The device is then removed from the mold by removing the cap and then flexing the flexible plastic mold while holding the mold upside down. The molded part simply falls right out. The extraneous line and plastic are trimmed from the device [flashing].

For convenience, a hole can be drilled into the device, preferably in one end, and an eye screw to fit the hole drilled inserted to provide a hook on point for line in the use of the device (see for example FIG. 5 (110)). Alternatively a hole can be drilled through the device, preferable on either or both ends of the device for line attachment.

The device is now ready to use.

Devices which use liquid in glass temperature sensing components which have the capability to measure high temperatures can be prepared using PREPARATION A provided the maximum temperature experienced by the sensor during the curing of the resin does not exceed the temperature the liquid in glass sensor can withstand before breaking.

2. PREPARATION METHOD B

The procedure used to prepare devices in which the temperature sensor was liquid in glass with a maximum temperature reading of only 100 degrees Fahrenheit was as follows (FIGS. 3A, 3B, 3C and 3D).

Figure 3A:
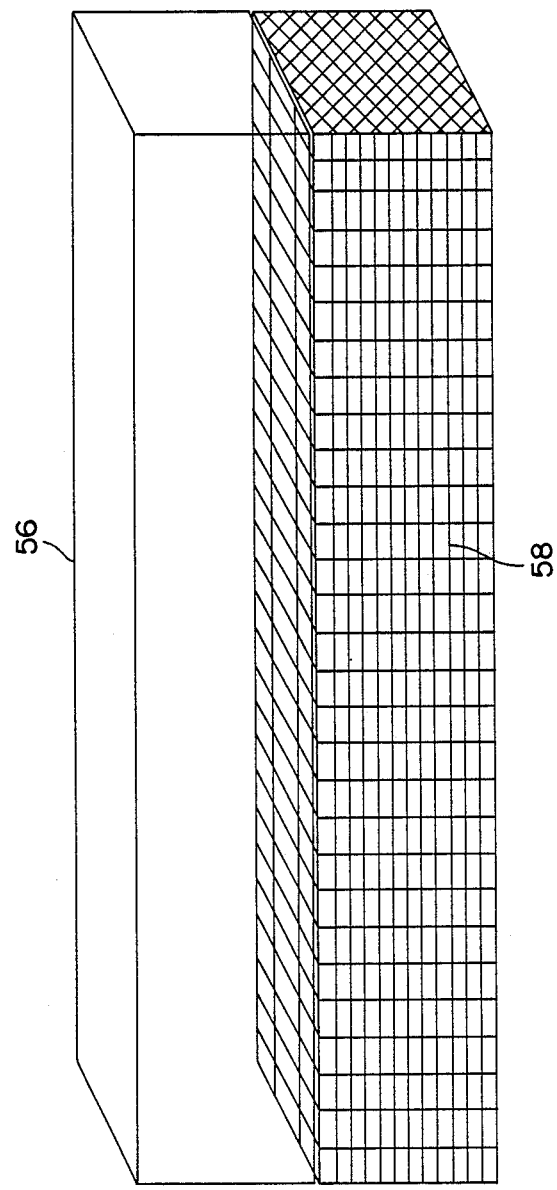
Figure 3D:
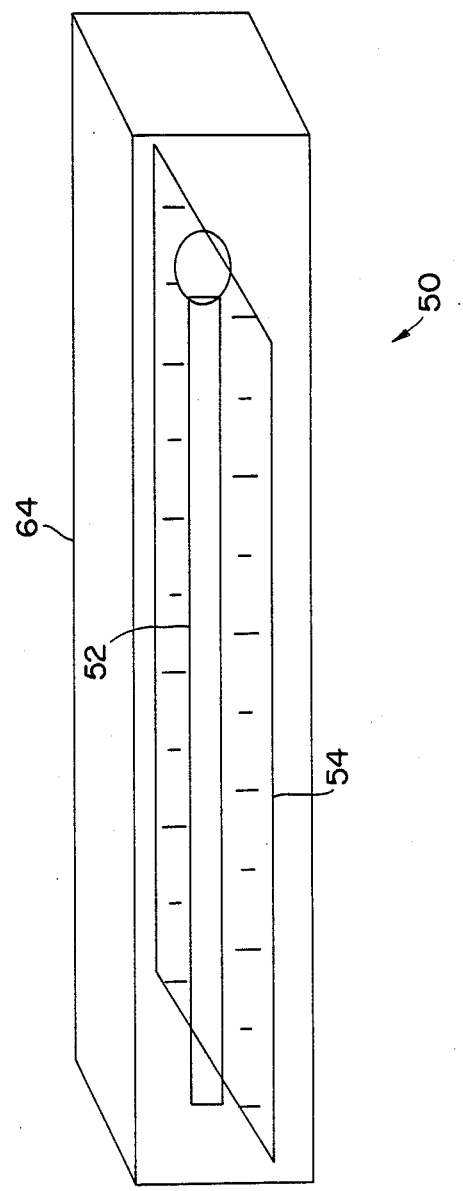

The temperature sensor (50) comprising an liquid (alcohol) in glass thermometer (52) mounted on a stainless steel scale (54) was obtained from PENN PLAX INC. Garden City, N.Y., 11530), cat. no. T-SS. This thermometer is designed to measure temperatures over the 30 to 100 degrees Fahrenheit range. A stainless steel hook (not shown) was removed from this unit so that no heat conducting metal would protrude from the finished device (FIG. 3D).

The device was prepared in three steps. The first step (FIG. 3A) comprised mixing 20 drops of methyl ethyl ketone peroxide catalyst into five ounces of EN-VIROTEX casting resin described previously. This mixture (58) was poured into a rectangular (5"×3"×1") mold (56). When this resin hardened sufficiently to easily support the weight of the temperature sensing component step 2 was performed.

In step 2 (FIG. 3B) the temperature sensing component (52) is placed onto the harden resin (58) prepared in step 1 (away from the edges). A second layer of resin (60), prepared by mixing only ten drops of catalyst with five ounces of resin, is poured over it. The lower use of catalyst slows the cure rate which prevents the temperature from becoming too which could break the temperature component. The rate of this layer can be very slow. Slight warming y enhances the cure rate. Caution is required if heating is used since it cannot exceed the usually mild temperature temperature maximum of the liquid glass thermometer, of about 110 degrees Fahrenheit in this case, which is the limit of the temperature sensor before it may break. Temperature sensors designed for higher temperatures will allow corresponding higher cure temperatures. A safer method is to perform step 3 after the second resin layer becomes firm.

Step 3 (FIG. 3C) consists of placing a thin layer (62) of highly catalyzed resin, prepared as in Step 1, on the second layer while it is still tacky. This layer cures quickly producing the desired hard surface and promotes the complete curing of the second layer (60 FIG. 3B). Since the third layer (62) is thin not much heat is produced. The third layer need only be as thick as the thinest pourable layer can be about 1/16"-⅛" or less. The finished device (50) is shown in FIG. 3D and consists of a temperature sensor (52) with a scale (54) embedded in a clear transparent matrix (64).

3. PREPARATION METHOD C

Figure 4B:
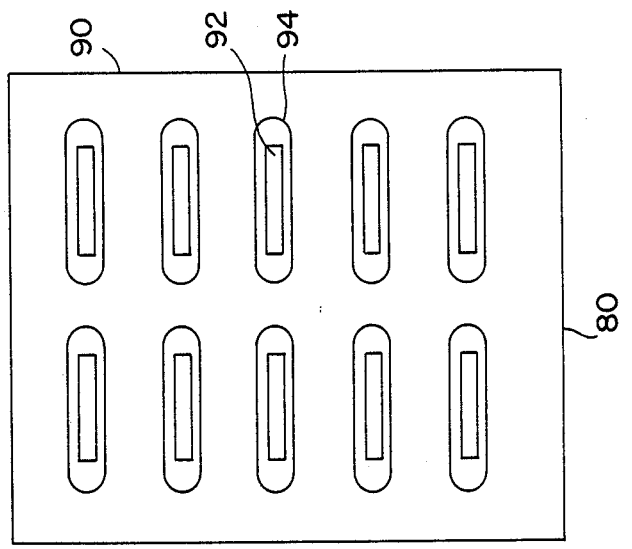

Devices representing the invention can be prepared using the more traditional method of casting plastic parts using a metal mold (FIG. 4) so long as certain modifications are implemented to accommodate the inclusion of the temperature sensing element.

An aluminum mold (80) was prepared in the usual fashion of pouring molten aluminum onto the desired mold shape made out of sand. This mold contained ten cavities (82) and consisted of two sections (84 and 90). The bottom half of the mold (84) (FIG. 4A) contained ten cavities each polished to a mirror-like finish and of the dimensions of 0.95" width by 0.48" depth by 4.6" long. The cavity can be any shape so long as it adequately encloses the temperature sensor to be added latter and allows removal of the device from the mold after casting.

The top half (90) (FIG. 4B) was identical to the bottom half except that slots (92) were cut in the top of the cavities which open the cavities to the air when the mold is assembled. These allow the introduction of the resin and escapage of trapped air. The cavities were polished to a mirror finish to impart a smooth glass-like finish to the device for good transparency.

This mold was used in the following manner. The bottom half (84) was laid flat and filled to about half with three ounces of catalyzed resin prepared from the GLASS-KOTE clear casting resin discussed previously. Clear green colorant was blended with the resin along with the catalyst to impart a pleasing clear blue color to the finished device. In using colorant it should be obvious that too much should not be added which could impared the reading of the temperature sensor.

Figure 4A:
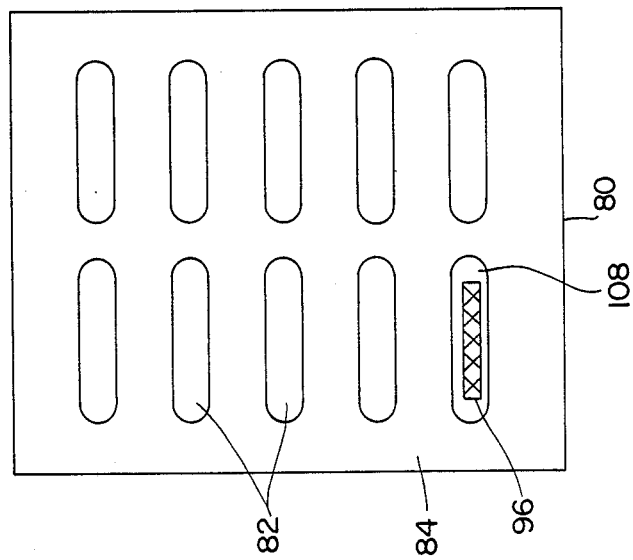
Figure 4C:
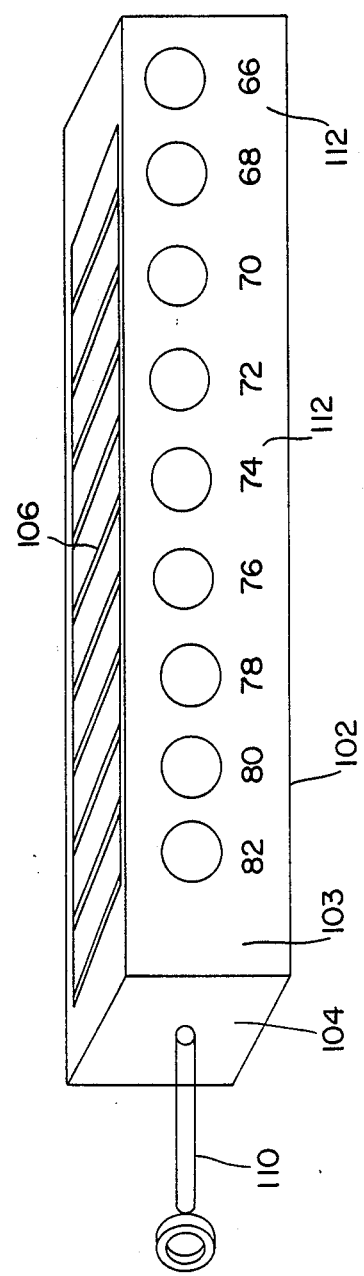

After the resin thickens, the temperature sensor (96) is laid onto the surface of the partially cured resin. Only the positioning of one of the ten temperature sensors is illustrated in FIG. 4A.

A preferred procedure (FIG. 4C) is to first attach a ¼"×4"×0.015" liquid crystal thermometer sensor (102) to one side (103) of a ¼"×¼"×4" acrylic rod (104). Useful information is then attached to one or more of the other sides. The ends of the rod were not used although they could be. This rod (104) containing the temperature sensor (102) was then laid onto the partially cured resin (108). A useful feature of the Procedure is that the square rod can easily be placed anywhere within the mold cavity (82). This can be used to position the attached liquid crystal temperature sensor at different locations to yield devices with a range of temperature response properties. The closer the temperature sensor is located to the edge of the mold cavity the thinner will be the layer of cured resin and therefore the faster the devices' temperature response will be. This is a useful method for controlling the temperature response properties of the device.

Once the temperature sensor has been positioned, the top half (90) of the mold (FIG. 4B) is added. The mold is clamped to prevent slippage. Catalyzed resin is then poured through the slots (92) until each mold cavity is full. It is useful to exercise care in pouring the resin to avoid trapping air.

The resin is then allow to cure or harden.

After hardening, the devices (FIG. 5 (100)) (ten devices for the mold illustrated in FIG. 4) are removed, de-flashed if necessary, and a eye screw (110) added at a suitable spot to facilitate the attachment of a line during use. FIG. 5 illustrates a finished device (100) prepared according to this procedure. As shown, information (106) on the optimum temperatures for some fish were included to facilitate the use of the device for fishing.

4. PREPARATION METHOD D

Figure 6A:
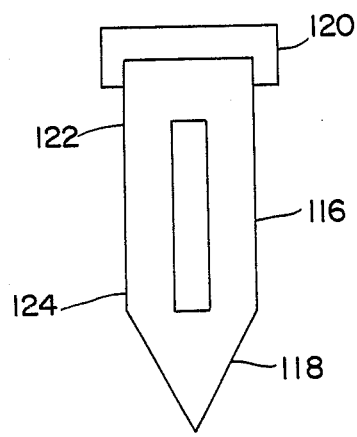

The preferred method used to prepare the devices of this invention was to use individual cylindrical polypropylene molds (FIG. 6A (116)). This provides a quick, flexible and simple method of device preparation in large quantities. This polypropylene mold (116) is a tube having a length of 4.5" and a diameter of 1.1" (124) just above a 0.6" high conical base (118) and 1.15" diameter at the top (122). The slight taper aids in removal of the molded part.

A ¼" square acrylic rod (FIG. 6B (104)) was cut to a length of four inches and the ends were polished. A hole was drilled into the center of one end of the rod (104) using a #51 drill bit. A C20 eye screw (110) (NETCRAFT CO. was screwed into this hole such that ⅜" of the shank remained outside of the rod. This spacing is important for positioning the insert as described below.

A liquid crystal temperature sensor (102) is attached to one side of the rod using glue.

Any other desired information is then attached to the other sides of the rod (106).

Catalyzed GLASS-KOTE resin with colorant is slowly poured into the mold (116) to just over half full. The insert containing the temperature sensor (Entire assembly of FIG. 6B) is placed into the resin slow enough to avoid trapping air bubbles. The eye screw (110) provides a handle for positioning the temperature sensor at the location in the mold for the desired temperature response of the device.

Once positioned enough additional resin is added to top off the mold and completely cover the insert. The final liquid level should lie immediately beneath the ring of the eye screw. This mode of introducing the eye screw has the added advantage of being very secure It can be difficult to obtain a firm screw setting in highly crystalline thermoset plastic.

Figure 6C:
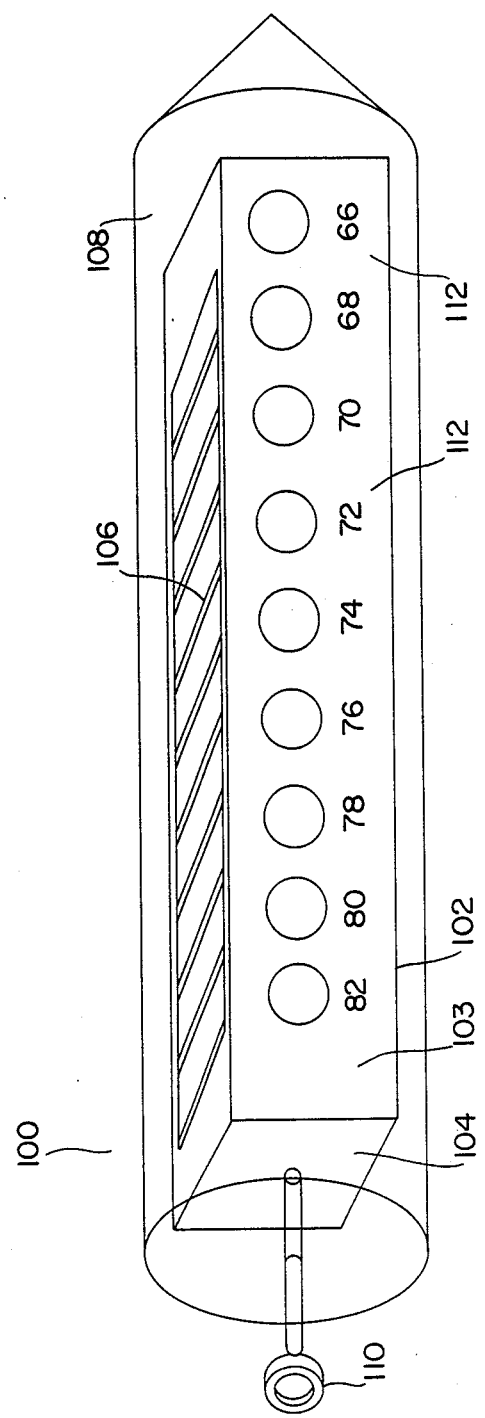

After the resin has substantially cured, the device is easily removed from the mold and is ready for immediate use. FIG. 6C illustrates the finished device.

The following examples serve to illustrate how the device of the invention is used to measure temperatures. These examples are for illustrative purposes only and in no way should be construed to imply limitations on the invention.

EXAMPLE I

The effectiveness of the device from EXAMPLE I was tested as follows.

Into a pan of lukewarm water (95.4 degrees Fahrenheit) was added a device prepared according to METHOD A which weighed 60.17 grams with a total volume displacement of approximately 55 milliliters and dimensions of 1.014 inches thick at the bottom, and 1.065 inches thick at the top with a conical bottom of 0.563 inches in length and with a total overall length of 4.20 inches. A stopwatch was started at the same time.

This device required seven minutes for the temperature to rise from less than 66 degrees Fahrenheit to 82 degrees Fahrenheit. At this point the device was removed from the lukewarm water and into the air under a light cool breeze of about 66 degrees Fahrenheit. The device was not dried off.

The temperature recorded by the device remained at 82 degrees Fahrenheit for four minutes then started to drop very slowly (about one degree per three minutes). This is plenty of time for a person to read the temperature.

EXAMPLE II

In a comparison test, a liquid mercury thermometer was tested in the same manner and under the same conditions as the device of this invention used in EXAMPLE I. Mercury thermometers are well known in the art. The one used in this test had the dimensions of 5.583 inches total length, 0.259 diameter, 0.638 inches mercury bulb length, 0.428 inches capillary length and covering the temperature range of minus ten to one hundred and ten degrees Celsius and readable to about 0.2 degrees Celsius.

In this test it was found that the temperature reading immediately fell upon removing the thermometer from the bath thereby preventing the bath temperature from being read in this manner.

Therefore it can be concluded that only surface temperatures can be measured using a normal thermometer and even then it has to be held beneath the water while the temperature is being read.

EXAMPLE III

Another device was prepared using METHOD A except that a smaller mold was used (three and one-half inches long and five-eights inches thick). This resultant smaller device has a thiner plastic layer covering the temperature sensor. As will become clear below, it was found that thinner plastic layers provide a faster response time than devices with thicker plastic layers.

This device was tested under the same conditions as in EXAMPLE I. The results were (1) that the device was warmed to eighty degrees in less than two minutes. (2)

When the device was removed from the bath into the air the reading remained at eighty degrees Fahrenheit for five minutes. This is excellent performance since very little time was needed for thermal equilibration and yet the device held the temperature for plenty of time for the user to withdraw the device from the water and read it. When taken with EXAMPLE I this demonstrates that the temperature response times can be controlled by varying the thickness of the plastic layer between the temperature sensing component and the liquid in which a temperature measurement is to be made.

EXAMPLE IV

This EXAMPLE illustrates that all combinations of liquid crystal temperature sensitive tape and resin are not useful for the present invention.

Two molds, illustrated in FIG. 3, of the dimensions, one and one half inch by three inches by one half inch, was filled half way with catalyzed polyester resin. One mold was made of latex and the other of polypropylene. Temperature tapes covering the range of 86 to 98 degrees Fahrenheit were laid on the resin in each mold when it had substantially hardened. Both molds were then filled with catalyzed resin. The temperature tapes drifted up near the surface during the curing process so that only a fairly thin film of about 0.01 inches of resin resided between the tape and the air. Both of these devices were found to cool quickly, within a few seconds, on lifting them out of warm water at 98 degrees Fahrenheit into air at room temperature. At least about 0.30 inches and preferably about 0.10 inches of resin should reside between the air and the temperature sensor.

EXAMPLE V

This EXAMPLE illustrates that the device is useful for measuring the temperature of bodies of liquid in which the usual temperature measuring methods would either fail or would be very difficult to implement. The device used in this test was prepared according to METHOD B.

It was desired to measure the temperature at the bottom of the Missouri River near St. Charles, MO., in January. This river at this location is filled with suspended solids (silt) making the water opaque and with drifting ice flows. The bank of the river was covered with thin ice which prevented any close approach to the water. For the reasons discussed previously, this temperature measurement could not be made using normal liquid in glass, liquid crystal, bimetallic strip or liquid expansion based thermometers. The use of a thermocouple device would be highly impractical and expensive as discussed previously. A device of this invention prepared according to METHOD B measuring 5.862 inches long 2.876 inches wide and 0.975 inches thick with a 4.23 inch long alcohol in glass temperature sensor covering the temperature range of 30 to 100 degrees Fahrenheit centrally positioned in it, was merely attached to the line of a fishing pole and then cast into the river at the desired location for the measurement. The water was flowing rapidly and was about three feet deep. The device was allowed to lie on the bottom of the river until thermal equlibration was attained as determined by repeatedly quickly removing the device from the water and reading the temperature from the scale associated with the temperature sensing device imbedded within the device. These readings did not vary widely but showed the desired smooth decrease with time. Thermal equilibration was reached at 37.0 degrees Fahrenheit when the temperature reading no longer dropped with time.

The device was then pulled from the river and the temperature was followed with time to record how well it retained the temperature reading of the bottom of the river.

The data obtained are given in Table I.

TABLE I

| Temperature response data for the device tested in EXAMPLE I. | |
|---|---|
| TIME (minutes) | TEMPERATURE (degrees Fahrenheit) |
| 2 | 37.0 |
| 3 | 37.0 |
| 4 | 37.2 |
| 5 | 37.2 |
| 6 | 37.0 |
| 7 | 37.0 |
| 8 | 37.2 |
| 9 | 37.2 |
| 10 | 37.2 |
| 11 | 37.4 |

It is clear from Table I that excellent temperature stability was achieved with the device despite the harsh environment the reading was made in.

EXAMPLE V-A

The device, used in EXAMPLE V held the 37.0 degrees Fahrenheit temperature reading for about one minute in sunlight. Of course this is still plenty long for a user to make a reading. However, if is desired that the device hold a reading for a long time it is preferred that the device be shielded from direct sunlight when sun radiation-absorbing plastics are used to prepare the device.

Since his device was made of unsaturated polyester resin it is important to shield it from the sun for the long period of the test since this resin strongly absorbs ultraviolet light from the sun. This can cause a significant warming rate.

EXAMPLE VI

The same device used in EXAMPLE V was used to measure the temperature of the Meramec River near Kirkwood, Missouri. The river contained much loose ice and it was desired to measure the temperature of the bottom of the river. The device was lowered into the river using monofilament line as in EXAMPLE V. The device was allowed to thermally equilibrate as in EXAMPLE V also. The water depth was about five feet. Table II lists the results obtained when the device was pulled from the river for reading. It is clear from this data that the device held the temperature of the bottom of the river for at least several minutes. This is plenty of time for the user to record the temperature.

TABLE II

| Temperature response data for the device tested in EXAMPLE II. | |
|---|---|
| TIME (minutes) | TEMPERATURE (degrees Fahrenheit) |
| 0 | 35.2 |
| 2 | 35.2 |
| 4 | 35.0 |
| 7 | 33.5 |

EXAMPLE VII

A device was prepared using METHOD B and a simple rectangular mold (FIG. 3). The temperature sensing component was a liquid crystal tape sensitive over the 66 to 86 degrees Fahrenheit range instead of the liquid-in-glass thermometer shown in FIG. 3. A high cure rate was possible since the liquid crystal ribbon is very stable at the high cure temperatures.

The final device measured one and one-half by four by three quarters of an inch. This device was equilibrated in lukewarm water at 86 degrees Fahrenheit. About four minutes were needed for this equilibration.

On removing the device into the air at 66 degrees Fahrenheit the device held the 86 degree reading of the bath for at least four minutes and only changed to 85 degrees after five minutes.

EXAMPLE VIII

A device was prepared according to METHOD B containing an alcohol temperature sensing component. This device measured two and three-fourths by five by one inch. This device was placed in a bath of water at 44 degrees Fahrenheit. This device held the temperature reading of the bath, 44 degrees Fahrenheit, for five minutes after removing it from the bath.

This is plenty of time to enable a user to read and record the temperature.

EXAMPLE IX

A device was prepared using METHOD B and a bimetallic strip as the temperature sensing component. The dimensions of this device was the same as that used in EXAMPLE VIII. This device required a fairly lengthy thermal equilibration time of about twenty-five minutes in a water bath at 86 degrees Fahrenheit. This was probably because of the insulating air gap around the bimetallic strip.

This device held the 86 degrees Fahrenheit bath temperature for at least five minutes on removing it from the bath.

This demonstrates the usefulness of this device for these types of measurements.

EXAMPLE X

This example illustrates how the device is used to aid in catching fish. At the lake of the Ozarks, Missouri the water temperature in the summer reaches about eighty degrees. A catch of two to four bass per day is normally a good catch. On a particular day the water temperature was 82 C. and no fish were encountered even after about six hours of fishing. The device prepared according to Method C was used to find water of the optimum temperature for bass (71 C.). This water was found near the mouth of a small spring fed stream entering the lake. In twenty minutes sixteen bass were caught by just one fisherman using artificial bait and just one rod and reel. Equivalent success was had by four fishermen in another boat very close (about fifty feet) nearby.

What is claimed is:

1. A device for measuring temperature in a liquid body comprising: a temperature sensing element integrally embedded in a thermally insulated matrix material selected from plastics and glasses, and mixtures thereof; said matrix material being chemically resistant to the liquid whose temperature is to be measured; said material having sufficient non-wetting and insulating properties to provide a heat flow pattern from the liquid such that the matrix assumes the temperature of the liquid at a desired level below the surface, and enable the temperature sensing element to measure and retain the temperature at the desired level sufficiently long that it may be observed and/or recorded after the device is removed from the liquid; weight means for ensuring that the device will assume a position at the desired level below the surface of the liquid; and means for supporting the device at the desired level for a time sufficient for the temperature of the liquid at the desired level to be transferred to the matrix material, and then to the sensing element, and said supporting means removing the device from the liquid after the temperature of the liquid at the desired level has been measured.

2. A temperature sensing device according to claim 1 wherein the temperature sensing element comprises a temperature sensing tape.

3. A device according to claim 1 wherein the matrix is sufficiently thick to avoid the temperature changing substantially as the device is moved through the liquid from the level from which a measurement has been made.

4. A device according to claim 3 wherein the matrix has a specific gravity greater than the specific gravity of the liquid whose temperature is to be determined.

5. A device according to claim 2 wherein information in addition to the temperature sensing tape is provided on or in the device which provides the user with said such additional information in a readily available manner.

6. A device according to claim 5 wherein the additional information is physically attached to or is integral with the temperature sensing tape.

7. A device according to claim 5 wherein the additional information is provided in the device separate from the temperature sensing tape.

8. A device according to claim 1 wherein a transparent window is provided in the matrix of sufficient size that a temperature sensing element temperature can be read.

9. A device according to claim 1 wherein the matrix is a plastic selected from thermosetting resins and thermoplastic resins.

10. A device according to claim 9 wherein the plastic is selected from clear plastics and translucent plastics.

11. A device according to claim 9 wherein the plastic is weighted with a heavy impregnate to obtain a desired total specific gravity for the device.

12. A device according to claim 9 wherein the plastic has a melting point above the temperature of the liquid whose temperature is to be measured.

13. A device according to claim 9 wherein the plastic is selected from the group consisting of polycarbonate, polymethylmethacrylate, polyvinyl halide, cellulose acetate, nitriles, nylons, fluoro-plastics, polybutylenes, polyesters, alkyd polyesters, polyethers, polyethylenes, ionomer polyethylenes, ethylene copolymers, polypropylene, polypentene, polystyrene, butadiene-styrene copolymers, polyurethane, polysilicones, polysulfones, epoxy resins polyformaldehydes and mixtures thereof.

14. A device according to claim 13 wherein a cellulose acetate polymer is used which is selected from the group consisting of cellulose triacetate, ethyl cellulose, cellulose acetate propionate butyrate and mixtures and combinations thereof.

15. A device according to claim 13 wherein a nylon polymer is used, selected from the group consisting of nylon 6, nylon 12 and mixtures and combinations thereof.

16. A device according to claim 13 wherein a fluroplastic polymer is used, selected from the group consisting of polychlorotrifluoroethylene and polyvinyl fluoride.

17. A device according to claim 13 wherein a polyester is used, selected from the group consisting of aromatic polyesters and alkyl polyesters.

18. A device according to claim 17 wherein the alkyl polyester is selected from the group consisting of polyethylene terephthalate and unsaturated polyesters in styrene co-polymer.

19. A device according to claim 13 wherein a polyether is used, selected from the group consisting of polyether imide and polyether ketone.

20. A device according to claim 13 wherein a polyethylene is used, selected from the group consisting of low density polyethylene and high density polyethylene.

21. A device according to claim 13 wherein an ionomer polyethylene is used, selected from the group consisting of ethylene acrylic acid, ethylene methacrylic acid, ethylene-ethylacrylate, ethylene-methacrylate, ethylene-vinylacetate and mixtures and combinations thereof.

22. A device according to claim 13 wherein a polyolefin polymer is used, selected from the group consisting of polymethylpentene, polypropylene, polystyrene, butadiene-styrene copolymers, vinylidene halide polymers and copolymers, styrene-acrylonitrile copolymers and styrene-maleic anhydride copolymers.

23. A device according to claim 13 wherein the matrix is selected from the group consisting of polysulfone, polyarylsulfone, and/or polyether sulfone.

24. A device according to claim 13 wherein a polyformaldehyde is used, selected from the group consisting of urea formaldehyde and melamine formaldehyde.

25. A method of reading temperature in a liquid comprising: lowering into the liquid whose temperature it is desired to measure a device including a temperature sensitive element embedded in a matrix selected from the group consisting of plastics and glasses and mixtures thereof which is chemically resistant to the liquid and which has sufficient insulating and non-wetting properties to enable the temperature sensitive element to retain the temperature measured in the liquid sufficiently long that it may be observed and/or recorded after it is removed from the liquid, the device having sufficient overall weight that it will descend into the liquid until a desired level below the surface is reached, allowing the device to remain at the level where a temperature measurement is desired until at least substantial thermal equilibrium is attained; rapidly withdrawing the device from the liquid; and reading the temperature obtained at the depth where the substantial thermal equilibration occurred.

26. A method according to claim 25 comprising promptly re-using the device to measure the temperature without further preparation of the device.

* * * * *